United States Patent [19]

Nordlund et al.

[11] Patent Number: 4,659,472
[45] Date of Patent: Apr. 21, 1987

[54] METHOD FOR PRODUCING A COMPOSTABLE MIXTURE OF SLUDGE FROM SEWAGE PURIFICATION PLANTS

[75] Inventors: Tore H. Nordlund, Torshälla; Lars E. Ljungkvist, Upsala, both of Sweden

[73] Assignee: Purac AB, Lund, Sweden

[21] Appl. No.: 686,910

[22] Filed: Dec. 27, 1984

[30] Foreign Application Priority Data

Jan. 4, 1984 [SE] Sweden ................. 8400043

[51] Int. Cl.⁴ ............................. C02F 11/14
[52] U.S. Cl. ......................... 210/609; 71/9; 71/13; 71/24; 210/621; 210/712; 210/727
[58] Field of Search ................. 71/9, 11–13, 71/23, 24; 210/609, 620, 621, 712, 710, 714, 725, 727, 728, 613, 737, 768, 778, 194, 195.1, 199, 202, 218, 241, 751

[56] References Cited

U.S. PATENT DOCUMENTS

| | | | |
|---|---|---|---|
| 3,285,732 | 11/1966 | Schulze | 71/9 |
| 4,046,689 | 9/1977 | Argyll | 210/241 |
| 4,082,672 | 4/1978 | Petroski | 210/241 |
| 4,392,881 | 7/1983 | Kneer | 210/609 |
| 4,414,335 | 11/1983 | Kipp, Jr. | 71/9 |
| 4,501,664 | 2/1985 | Heil et al. | 210/218 |

FOREIGN PATENT DOCUMENTS

| | | | |
|---|---|---|---|
| 1965734 | 7/1971 | Fed. Rep. of Germany | 210/778 |
| 2250610 | 4/1974 | Fed. Rep. of Germany | 210/609 |
| 2315705 | 10/1974 | Fed. Rep. of Germany | 71/9 |
| 2708313 | 8/1978 | Fed. Rep. of Germany | 71/13 |
| 2497790 | 7/1982 | France | 210/609 |
| 57-135790 | 8/1982 | Japan | 71/9 |
| 58-29272 | 6/1983 | Japan | 71/9 |
| 59-87098 | 5/1984 | Japan | 210/609 |

Primary Examiner—Peter Hruskoci
Attorney, Agent, or Firm—Fred Philpitt

[57] ABSTRACT

The invention relates to a method for producing a product from which compost can be suitably produced and which contains sludge obtained from a sewage purification process, in which method the sludge is mixed in a fluid state with a finely-divided carbon-carrier selected from the group sawdust, peat and bark, and with polyelectrolyte, and is then mechanically dewatered to a dry substance content of at least about 28 percent by weight.

7 Claims, 1 Drawing Figure

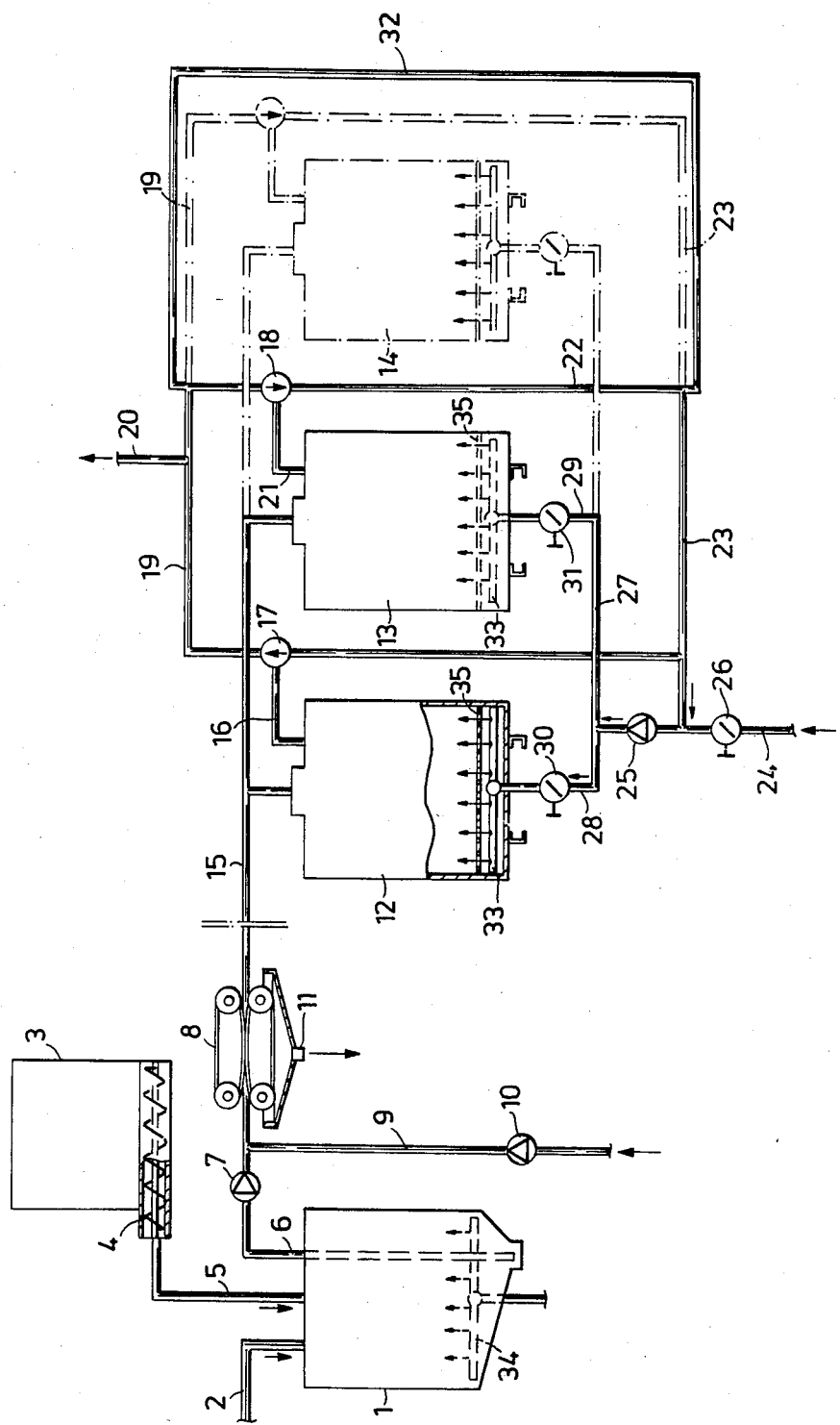

METHOD FOR PRODUCING A COMPOSTABLE MIXTURE OF SLUDGE FROM SEWAGE PURIFICATION PLANTS

The present invention relates to a method for producing a compostable mixture of sludge obtained from sewage purification plants.

It is well known that decomposition of such sludge to produce compost is encumbered with difficulties. There are a number of reasons to account for this. Firstly, the amount of decomposable carbon present in the material is not sufficient to enable the material to react satisfactorily with the enzymes of microorganisms responsible for the decomposition of the material to form compost. Secondly, it is extremely difficult to dewater the material to a solids content at which the material can be effectively composted. Although it may be possible to dewater the material to a relatively high solids content with the aid of highly effective technical auxiliary means, the properties of the resultant material are not such as to enable the material to be brought into effective and uniform contact with the air, or oxygen-containing medium, required to effect a composting process.

It has now been found that the aforementioned disadvantages can be avoided, completely or substantially completely, by means of a method in which sludge taken from a sewage purification plant and maintained in the same form as that which it had when leaving the plant is mixed with a carbon-carrier taken from the group sawdust finely-divided bark or finely-divided peat, and with polyelectrolyte, and the resultant mixture is then mechanically dewatered to a solids content of at least about 28 percent by weight.

As a result of mixing the sludge with the finely-divided carbon-carrier in an unthickened state, while the sludge is highly fluid, there is readily obtained an intimate mixture in which the sludge particles adhere to the larger particles of carbon-carrier, to form an agglomerate from which water can be readily removed with the aid of the polyelectrolyte when pressing the mixture. Subsequent to pressing the mixture there remains a homogeneous mass or pulp, which when introduced into a container packs to a porous layer or a pure porous mass through which the oxygen-bearing gas used to decompose the mass is able to pass without channeling. This is extremely important with view to the fact that the composting process also includes a heat-treatment step which aims at killing pathogenic microorganisms and in which all parts of the material are required to be brought into contact with the oxygen-containing medium, such that no area remains at a temperature which is not sufficiently high to ensure that the harmful microorganisms are killed.

One important advantage afforded by the method according to the invention is that the amount of carbon-carrier introduced can be reduced within the framework of that amount required to ensure that the mixture can be decomposed to compost form. This effect can be ascribed to the fact that the sludge particles and carbon-carrier are so intimately mixed in the mixture that the carbon-carrier can be utilised more effectively. Whereas it is normal practice when preparing compostable material to use carbon-carrier in amounts of roughly 25 percent by weight, this amount can be reduced to additions in the range of from 10 to 20 per cent by weight when proceeding in accordance with the invention.

An extremely important advantage afforded by the method according to the invention is that it can be carried out with smaller apparatus-contributions; this applies in particular to the step of mixing the main ingredients, sludge and carbon-carrier, which step does not require the power-consuming assistance of mechanical auxiliary devices.

It has been found that by means of the combination of procedures according to the invention, it is possible, in simple fashion, to prepare compostable mixtures of sludge having high solids contents of at least 28 percent by weight, and particularly 28–42 percent by weight.

For example, when the material as mixed with the sludge is sawdust, the important advantage is afforded that the material can be mixed directly with the wet sludge, without needing to be finely-divided in a separate stage. The present invention enables sawdust products of high water content to be put to useful use while solving, at the same time, the problem of disposing waste sawdust produced in the saw mill; hitherto sawdust products of high water content have been rejected as a fuel due to the necessity of drying the products.

In accordance with one embodiment of the invention, the ingredients can be mixed together while injecting thereinto an oxygen-bearing medium, preferably air. It has been found that the mixture desired can be quickly obtained by injecting an oxygenous medium into the premix. At the same time there is also afforded the advantage that the aerobic microorganisms present are made active, so that the subsequent composting process can be commenced with microorganisms which are more active than would otherwise be the case and thus resulting in a more rapid process of decomposition.

According to another embodiment of the invention, the carbon-bearing substance used may be one which has a relatively high water content. The aforementioned materials, sawdust, peat and bark, have a low value when highly saturated with water, since they are then less attractive as fuel. The invention provides the advantage of using such water-saturated materials in a beneficial manner. The high water contents do not impose any economic or technical load on the process, since it is necessary, under all circumstances, to subject the material to a subsequent pressing stage in order to separate the water from said material.

The invention is particularly advantageous when the water content of the material is so high that the material can be said to be in suspension. This enables the material to be readily introduced into the mixing zone, e.g. by pumping or like procedures, thereby also enabling the material to be dispensed more positively in metered quantities.

The product produced by the method according to the invention is preferably intended for producing compost. The nature of the product enables it to be composted by various kinds of composting processes. Preferably, the material is composted in relatively small containers having connected to the bottoms thereof supply lines for air or optionally for some other oxygenous medium, the material in said containers forming a static bed or a static layer. In order to nake the composting process as advantageous as possible with respect to apparatus contributions, the process is suitably divided into two stages, namely a pre-composting stage which is effected in a container and the main purpose of which is to kill pathogenic microorganisms, to which end there is required treatment at a high temperature of at least 50° C., preferably 60° C., over a long period of time, a seven day period at 50°-60° C. being considered to safely kill such organisms, and a subsequent composting process which can be carried out with the least possible apparatus-contribution and in which the pre-composted and thus hygienized material can be placed on a gas-permeable plate and treated with air until the desired degree of decomposition has been reached.

By composting the product of the method in a container, the important advantage is afforded that bio-activated exhaust air from an adjacent container in which an earlier composting process has been carried out can be used to initiate the composting process in the first container and, once the process has achieved a certain rate of decomposition, to maintain this rate. By bio-activated air is meant the carbon-dioxide containing hot exhaust gas which departs from the upper surface of the mass being composted when, as is most normally the case, air is fed to the bottom of the mass, this exhaust air, due to its saturation with water vapour, containing a mist of fine water droplets saturated with microorganisms of the kind taking part in a composting process.

The invention also relates to compost-producing apparatus comprising a first station which includes a plurality of transportable containers each of which having a space for the material undergoing decomposition and each being intended to serve as transport means for transporting partially decomposed or composting material to a second compost-producing station, characterised in that said apparatus at said first station is provided with means for connecting the containers to an air-supply source and means for connecting said containers to an outlet conduit for exhaust air.

BRIEF DESCRIPTION OF THE DRAWING

The accompanying flow sheet illustrates one embodiment of a method according to the invention and the further use of the product of said method.

Wet sludge obtained from a sewage purification plant and having a solids content of about 3 percent by weight is introduced into a mixing container 1 through a first infeed line or conduit 2 with the aid of a suitable pump. Sawdust taken from a storage vessel 3 is introduced into the container 1 through a second infeed line 5 with the aid of a screw feeder 4. The sawdust has a dry solids content of 40 percent by weight and a density of 350 kg/m$^3$. Normally, such sawdust is not suitable for use as fuel, because of its high water content, which amounts to 60 percent. The mixing container 1 has a volumetric capacity of 30 m$^3$·25 m$^3$ of sludge is fed through the line or conduit 2, while 1.3 m$^3$ of sawdust is fed through the line or conduit 5, i.e. 455 kg. The mixing container 1 has arranged at the bottom thereof an air-distributing means 34, through which air is introduced into the contents of the container 1, in a manner to ensure that the said contents are stirred or turned to the extent required, this stirring or turning of the contents thus being effected without the aid of mechanical auxiliary devices. Because the sludge is fluid it will be rapidly and effectively mixed with the sawdust, to form a homogeneous mass, with the aid of the aforementioned air-stirring of said ingredients. Although there is nothing to prevent mechanical auxiliary devices from being used in order to obtain a more thorough mixing of the ingredients, the mixing effect obtained with the aid of air is normally sufficient to render the use of such auxiliary devices unnecessary. The injection of air into the mixture of sludge and sawdust also affords the advantage of initiating or accelerating an aerobic decomposition process, and results in a more rapid increase in temperature in the subsequent composting stage. The resultant suspension of sludge and sawdust is then withdrawn by suction from the mixing container 1 and passed through an exhaust conduit 6 to a screening belt-filter 8. At a location upstream of the point at which the suspension is passed to the filter 8, the suspension is supplied with polyelectrolyte solution in an amount corresponding to 2 kg of polyelectrolyte, calculated on the whole of the suspension, this polyelectrolyte solution being pumped through a conduit 9 by means of a pump 10. The belt filter 8 comprises two endless belts which are brought together at a pressing zone. The mixture of wet sludge sawdust and polyelectrolyte are introduced into the pressing zone and there pressed to a solids content of 30 percent by weight, whereupon the water pressed out from the suspension runs down through a drain 11. The high dry solids content of the thus pressed mixture imparts surprising properties thereto, which render the mixture extremely suited for a subsequent composting process. Thus, there is obtained a homogeneous and porous mass without requiring the use of mechanical auxiliary devices in the preparation of the mixture. The main purpose of the sawdust supplied is to serve as a carbon carrier in the resultant, pressed, compostable mixture. The sawdust, together with the polyelectrolyte, also serves to facilitate dewatering of the sludge. It has been surprisingly found that within the framework of what is required with respect to the function of a carbon-bearing substance, less sawdust than would be expected is required to achieve a given dewatering effect.

The resultant compostable mixture of high solids content can then be subjected to a composting process. To this end, there is used a plurality of transportable composting containers 12, 13 and 14 each of which has a volumetric capacity of 15–20 m$^3$ and to which compostable, pressed material from the filter 8 can be selectively transported with the aid of a conveyor belt 15. Each container 12, 13 and 14 has arranged at the bottom thereof a device 33 for supplying air to respective containers and distributing said air therein, in a manner to cause the air to pass through the mass of compostable material present in the container. Connected to the top of each container is an exhaust-air conduit, the conduit extending from the container 12 being referenced 16 and the conduit from the container 13 being referenced 21. Exhaust air is passed to a three-way valve, the valve allotted the container 12 being referenced 17 and the valve allotted to the container 13 being referenced 18. The valve 17 is set so that exhaust air deriving from the container 12 can be passed through the exhaust conduit 16 and conduit 19 directly to the surrounding atmosphere (optionally after being cleansed) through the outlet 20. The exhaust air obtained in the container 13 passes through the exhaust conduit 21 to the three-way valve 18, which is set so that said exhaust air is partly recycled through recycling conduits 22 and 23 and partly discharged to the surrounding atmosphere, through conduits 23, 32 and 19. The recycling conduit 23 is connected to an inlet conduit 24, which incorporates a fan 25, and a control valve 26. The inlet conduit 24 is connected to a distributing conduit 27, which in turn is connected to a branch conduit 28 leading to the container 12, and to a branch conduit 29 leading to the container 13. The branch conduit 28 incorporates a control valve 30 which controls the supply of composting air to the compostable mass present in the container 12, and the branch conduit 29 incorporates a control valve 31 having the same purpose as the control valve 30. Surplus gases in the system are passed to the conduit 19 and the outlet 20, through a conduit 32, when the control valve 17 is set to the position illustrated in the drawing. As will be understood, the valves 17 and 18 can be reset in each particular case, to provide the same effect, wherewith surplus gas will then pass out through the conduit 22. The container 14 illustrated in broken lines symbolizes the possibility of providing transportable composting containers additional to the containers 12 and 13 in the station in which the composting process is carried out.

Slightly above the device 33 for supplying air to the container 12, 13 or 14 there is arranged a grid-like bottom 35 which serves as a support for the mass undergoing composting in the respective container. Below the grid, there is formed a space for the device 33 thereby to attain that the air streams leaving orifices in the device are united into one stream which is uniformly contacted with the underside of the grid and caused to enter uniformly distributed into the mass of composting undergoing material after having passed the grid bottom.

Immediately a container 12 or 13 has been filled with compostable material from the dewatering filter 8, air is supplied through the conduit 28 in an amount controlled by means of the control valve 30. The material contains sufficient microorganisms to initiate the formation of enzymes and therewith the decomposition of the material while generating heat. After 24 hours it was found that the temperature had risen to 50° C. The material can be considered free from harmful pathogenic microorganisms (to be hygienized) after 7 days at a temperature within the composting material of 50°-60° C. The container, together with its contents, can now be collected by a loader and moved to a further site, where the material is finally composted and then matured. The material can be finally composted in the open air, in which case the material is placed on an airpermeable plate and treated with air until a product having the desired properties is obtained. The container used to transport the material is then moved back to the composting site. Subsequent to filling the container with further compostable material of high solids content from the dewatering filter 8, a further treatment period is initiated and driven to a temperature of 50° C., whereafter the material is partially composted and hygienized at a temperature of 50°-60° C.

The exhaust air departing from respective containers through the exhaust conduit 16 or 21 is warm and saturated with moisture and consequently condenses very readily to form a mist of fine water droplets. These water droplets are able to form seats for microorganisms from the mass of material being composted in said container. By recycling exhaust air containing microorganisms to a further container, it is possible to initiate the formation of enzymes in the compostable mass present in the container more rapidly than if the decomposition process was commenced with the sole use of microorganisms obtained from the sewage sludge. The valve 18 is set so that warm and moist air containing mioroorganisms and obtained from the container 13 is recycled to the container 12 via the inlet conduit 24, the distributing conduit 27 and the conduit 28. If the container 12 has been newly filled with compostable material, the decomposition process will be initiated very rapidly as a result of recycling said exhaust air.

We claim:
1. A method for composting a sludge obtained from a sewage purification plant, which comprises the steps of
   (a) mixing said sludge in its undewatered fluid state (1) with 10-20% of a water stauraded finely divided carbon-carrier selected from the group of sawdust, peat and bark and (2) with an effective amount of a polyelectrolyte to aid in dewatering said sludge,
   (b) injecting sufficient air into said sludge and said carbon-carrier during said mixing operation to initiate aerobic decomposition of said sludge,
   (c) mechanically dewatering the resultant mixture to a dry substance content of at least about 28 percent by weight, and
   (d) subjecting the dewatering mixture resulting from step (c) to an aerobic composting process in a plurality of transportable containers, including a first container and a second container, producing a partially composted material and exhaust air containing microorganisms; and recycling at least a portion of the exhaust air from said second container to said first container to initiate formation of enzymes in the composted material.

2. A method for producing a product suitable for conversion to compost and containing sludge obtained from a sewage purification plant, which comprises the steps of
   (a) mixing said sludge in its undewatered fluid state with 10-20% of a water saturated finely divided carbon-carrier selected from the group consisting of sawdust, peat and bark,
   (b) agitating said sludge and said carbon-carrier during said mixing operation and injecting sufficient air into said sludge to initiate aerobic decomposition of said sludge,
   (c) adding an effective amount of a polyelectrolyte to the mixture resulting from step (b) to aid in dewatering said sludge,
   (d) mechanically dewatering the resultant mixture of said sludge, said carbon-carrier and said polyelectrolyte to a dry substance content of at least about 28 percent by weight of the dewatered compostable mixture and
   (e) subjecting the dewatered mixture resulting from step (d) to an aerobic cpmposting process in a plurality of transportable containers, including a first container and a second container, producing a partially composted material and exhaust air containing microorganisms; and recycling at least a portion of the exhaust air from said second container to said first container to initiated formation of enzymes in the composted material.

3. A method according to claim 2 wherein said polyelectrolyte is added to the mixture resulting from step (b) in a continuous manner.

4. A method according to claim 3 wherein the carbon-carrier has a water content high enough so that the carbon-carrier is in the form of a slurry before it is mixed with said sludge.

5. A method according to claim 4 wherein the carbon-carrier has a 60% water content.

6. A method according to claim 2 wherein the carbon-carrier has a water content high enough so that the carbon-carrier is in the form of a slurry before it is mixed with said sludge.

7. A method according to claim 6 wherein the carbon-carrier has a 60% water content.

* * * * *